United States Patent Office 2,918,080
Patented Dec. 22, 1959

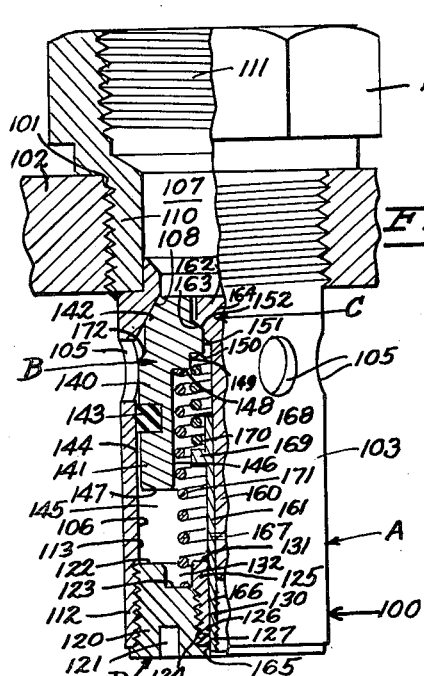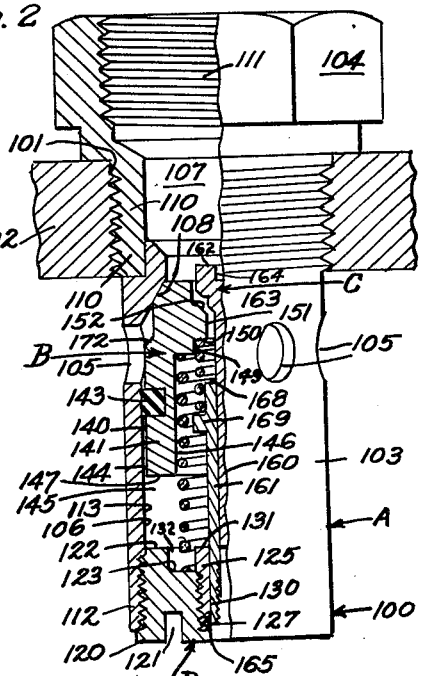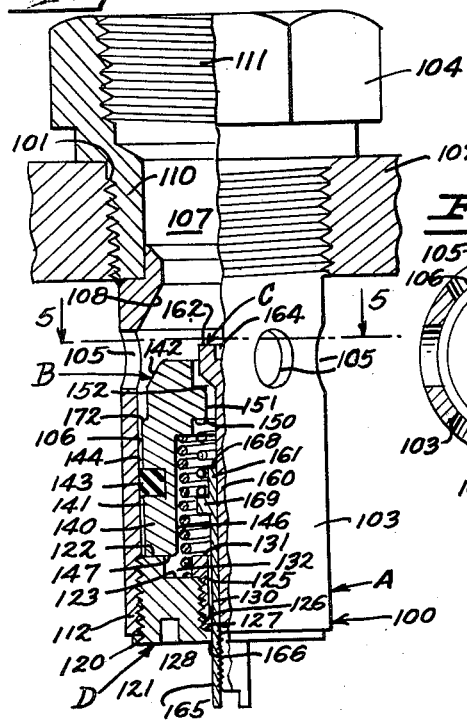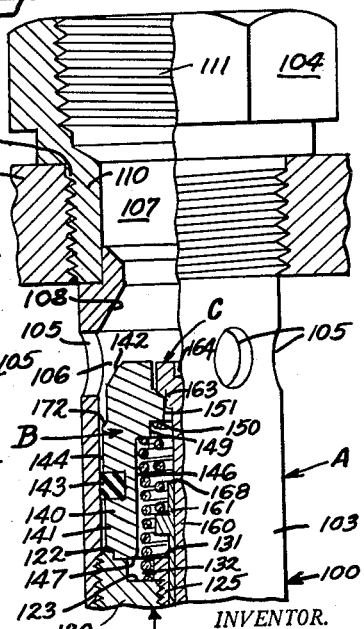

2,918,080
PILOT OPERATED VALVE
John K. Heller, Woodside, Calif.
Application September 21, 1953, Serial No. 381,241
4 Claims. (Cl. 137—490)

This invention relates to an improved quick-acting valve, whose operation depends, at least partly, on pressure differentials operating on different portions of the main valve member.

One purpose of this valve is to facilitate the control large volumes of fluid, under pressure, by a very small pilot valve which itself can be operated with a small amount of energy. The fluid may be liquid, gas, or vapor, and the pilot valve may be operated manually, mechanically, electrically, pneumatically, hydraulically, or otherwise.

Onother object of the device is to provide a relatively quick acting valve that moves rapidly from its closed position to its fully open position and also closes quickly. A fast, positive, automatic operation is achieved by making use of different pressures acting on areas of different sizes: when the total force urging the valve toward one direction is greater than the total force tending toward the other direction, that greater force will control the valve and move it to, or hold it in, its desired position. The pilot valve is so adapted that once it starts to change the direction of the controlling pressure, the pressure changes rapidly to move the valve in that other direction.

The invention enables the fluid itself to do most of the work of operating the valve, except for the actuation of the pilot valve, and in some cases the fluid may also actuate the pilot valve.

The invention is applicable also to safety relief valves, the same general principle being applied to cause the pilot valve to react to a critical fluid pressure so as to cause a quick opening of the main relief valve. As a relief valve, the invention makes it possible to use a short compact valve that can fit directly inside the tank containing the fluid. It also makes possible the use of a short spring that, in volatile liquids, may be in contact only with the vapor and need not extend into the liquid itself.

The valve of this invention is characterized also by the fact that it does not set up turbulence in the fluid being controlled, by its positive control, and by its great adaptability, low cost, and suitability to precision work.

Other objects and advantages of the invention will appear from the following description of certain preferred embodiments, selected to illustrate a few of the many particular uses to which the invention may be put.

In the drawing:

Fig. 1 is a view in elevation and partly in section of a modified form of the invention adapted for use as a safety valve. The valve is shown in its fully closed position.

Fig. 2 is a view similar to Fig. 1 showing the main valve, still closed, but with the pilot valve forced partly open under an excessive pressure that is to be relieved.

Fig. 3 is a view similar to Fig. 2 with the main valve automatically moved to its fully open, pressure-relieving position by the pressure effect brought about by the opening of the pilot valve.

Fig. 4 is a view similar to Fig. 3 with the main valve still open but with the pilot valve closed, because of a reduction in pressure below the critical amount. The pressure effects brought about by this action of the pilot valve automatically move the main valve back to its Fig. 1 position.

Fig. 5 is a view in section taken along the line 5—5 in Fig. 3.

In this invention the on-and-off valve has four principal parts: a valve body A that provides the inlet, the outlet, and the valve cylinder; a main valve member B that moves in the valve cylinder to connect the inlet with, or separate the inlet from, the outlet; a pilot valve C that controls the opening and closing of the main valve; and a plug and guide member D that closes one end of the valve cylinder against undesired leakage therethrough and also guides the movement of the pilot valve C.

Whether the pilot valve C should be controlled manually, mechanically, electrically, pneumatically, or hydraulically, will depend on what is most advantageous in the particular application. In any event, the effect of the movement of the pilot valve C is always to cause a difference in the pressures acting on the main valve B. The main valve B is so proportioned and so arranged in the valve housing A that a change of pressure produced by the pilot valve C will move the valve B to open or close the passage between the inlet and the outlet. Moreover, the initial movement of the valve B acts back on the pilot valve in such a way as to accelerate the change in pressures, so that the valve B opens and closes very quickly.

The principles of this invention may be applied to a high capacity safety valve 100. This valve is designed primarily for installation in a tap outlet 101 in a pressure tank, only a portion 102 of the tank wall being shown here. The safety valve 100 can, of course, be used equally well in a casing of its own, and if desired it may be of a flanged construction.

The valve body A here comprises a generally cylindrical tubular member 103 having an enlarged head 104. A plurality of inlet perforations 105 extend radially inwardly into the central passage 106, so that the inlets 105 are again disposed at a right angle to the outlet passage 107, being separated therefrom by a generally conical port 108 against which the main valve B seats. The upper portion 110 of the body stem 103 may be exteriorly threaded for insertion into the threaded tank opening 101, and the interior wall 111 of the outlet passage 107 may be threaded for attachment to a suitable fitting (not shown). The lower portion of the central passage 106 may also be interiorly threaded at 112 to receive the plug D. Between the port 108 and the threaded portion 112 the passage 106 has a long smooth bored portion 113 serving as the valve cylinder for the main valve B.

The plug D in this instance includes two members. A cap 120 is threaded into the lower end 112 of the body 103, being provided with a suitable key 121 for a spanner wrench (not shown) so that it can be adjusted. The inner (upper) end of the cap 120 is stepped to provide two annular, coaxial shoulders 122 and 123, the radially outer slotted shoulder 122 extending further axially (upwardly) than the radially inner shoulder 123. The cap 120 also has an axial, threaded, outwardly-extending opening 124 into which a hollow guide cylinder 125 (the other member of the plug D) is threaded so that its outer end 126 compresses a dust wiper 127 against a shoulder 128 at the outer end of the opening 124. The cylinder 125 has a smooth bore 130 that serves as a guide for the pilot valve C, sufficient clearance preferably being provided to pass fluid into the interior of the valve 100. The cylinder 125 terminates on its inner side in a head 131 that extends further axially (upwardly) than the shoulder 123 of the cap 120, so that the shoulder 123 is, in effect, the bottom of an annular recess 132.

The main valve B comprises a unitary hollow member 140 having a cylindrical piston portion 141 and a generally conical seat portion 142, normally in engagement with the conical walls of the port 108 of the valve body 103. The periphery of the piston portion 141 may be recessed annularly and provided with an annular dust wiper 143. However, there should normally be sufficient clearance 144 between the valve piston 141 and the bore 113 to permit a controlled leakage of fluid from the inlets 105 into the chamber 145 at the lower end of the main valve 140. Interiorly the valve piston 141 has a long, generally cylindrical passage 146 extending from the end annular shoulder 147 to a second annular shoulder 148, whence a passage 149 is stepped radially inwardly and extends to a third annular shoulder 150. A relatively narrow axial port 151 extends from the inner end of the third shoulder 150 and then an outward flaring passage 152 provides a conical seat for the pilot valve C.

The pilot valve C preferably comprises two concentric or coaxial members; a solid pilot stem member 160 and a hollow pilot sleeve member 161. The pilot stem 160 terminates at its upper end 162 in an outwardly flared conical portion 163 adapted normally to close against the seat 152 so that the port 151 is closed. The forward face 164 may be concave or hollow, if desired, for lightness.

The sleeve 161 is threaded around the lower end of the stem 160. The smooth outer cylindrical lower wall 165 of the sleeve 161 is enough smaller than the guide bore 130 so that the fluid can leak from the tank into the space 145 via the clearance 166 in between the sleeve wall 165 and the bore 130, as well as through the clearance 144 between the main valve 140 and the valve body 103. Relative movement between the sleeve 161 and the stem 160 may be prevented by a lock pin 167.

Adjacent its inner (upper) end 168 the pilot valve sleeve 161 may be provided with a flange 169. A pilot pressure spring 170 is compressed between the flange 168 and the shoulder 150 of the main valve 140, so as to urge the pilot valve to a normally closed position.

A second spring 171, which may be termed a return spring, extends between the second shoulder 148 of the main valve 140 and the shoulder 123 in the annular recess 132. This spring 171 tends to keep the main valve 140 normally seated, until the pressure differential between the different areas of the valve 140 causes it to open.

*Operation of the valve 100*

Normally the valve 140 is closed, because the pressure of the spring 171 and the pressure of the fluid against the three annular shoulders 147, 148, and 150 more than balance the weight of the valve 140 and the downward pressure against the ledge 172 on the exterior of the valve. Therefore, so long as no excessive pressure is built up, the valve 140 is retained in its Fig. 1 position. Similarly, the pilot spring 170 normally keeps the pilot valve closure member 163 seated against the conical portion 152.

When, however, the fluid pressure inside the tank reaches the design relief pressure of the valve 100, the pressure inside the chamber 146 also reaches that value, due to leakage through the clearances 144 and 166. Then the fluid pressure against the conical portion 163 more than balances the pressure of the pilot spring 170 and forces the pilot valve open somewhat, into its Fig. 2 position.

When this happens, and when the pilot valve opens far enough so that the fluid passes out the pilot valve port 151 more rapidly than it leaks in through the clearances 144 and 166, then the pressure in the space 145 is reduced and the pressure on the ledge 172 of the main valve 140 and its weight overbalance the spring 171 and the reduced pressure against the shoulders 147, 148, and 150. Therefore, the tank pressure forces the main valve 140 open somewhat. This opening tends further to increase the flow through the pilot valve port 151, and therefore the valve 140 moves rapidly to its fully open position shown in Fig. 3, the pilot valve and the pilot spring 170 moving with the main valve.

When the pressure blows itself down or relieves itself, so that it is no longer excessive, the pilot valve automatically seats, as in Fig. 4 and pressure is again built up in the space 145. When the pressure builds up sufficiently, the return spring 171 is enabled to assist the pressure against the shoulders 147, 148, and 150 to close the main valve 140, returning it to its Fig. 1 position.

The annular area of the inner end 168 of the pilot valve sleeve 161 may be proportioned to the area of the pilot valve seat 163. If the sleeve area 168 is larger than the seat area 163, then the pilot valve will open still wider when the pressure becomes reduced in the space 145, resulting in a small differential between the start-to-leak position and the full open position. At the same time this results in a greater range of blow-down. By a proper choice of these relative areas any desired characteristic may be obtained.

The relieving pressure may be set by screwing the pilot stem 160 and its sleeve 161 together before inserting them into the valve, and this may be done in a suitable designed jig. Screwing the parts together has the effect of adjusting the pressure on the pressure spring 170. When the proper setting is obtained, the stem 160 and sleeve 161 may be drilled, the lock pin 167 inserted, staked in place, and the pilot valve assembly will from then on be unitary. The entire assembly of the main valve, the pilot valve, the pilot valve sleeve, and the two springs may be inserted into the valve body and then the plug D may be screwed in and if desired staked in place.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A quick-opening and quick-closing safety valve for a container for vaporizable fluids, including in combination: a generally tubular valve housing flanged at one end for attachment to said container and having an axial passage therethrough with an outlet opening at its flanged end, and a generally radially inward conical restriction forming a valve seat adjacent said outlet opening, and a smooth-bored valve cylinder on the other side of said valve seat, said housing having generally radial perforations through the walls of said cylinder adjacent said valve seat to provide inlets; plug means secured to the other end of said housing from the outlet and having an axial guide passage therethrough; a main valve member slidable axially in said housing axial passage toward and away from said valve, said member having a generally conical nose portion adapted to close against said seat and a piston portion slidable in said cylinder, said piston having a larger exterior diameter than said nose and joined thereto by an annular shoulder so that the pressure of said fluid from the inlets against said shoulder tends to move said valve away from said outlet and hold it away, said valve member being hollow and having an axial passage extending therethrough, said passage having a restricted portion between two wider portions; means for conducting fluid at all times into said cylinder between the outer end of said piston and said plug, the pressure of the fluid therein against the outer end portions of said piston and against radial portions thereof adjacent said restricted portion tending to close said valve member against said seat; first spring means between said plug and said piston urging said main valve toward its closed position; a pilot valve member having a stem portion extending through said plug axial guide passage and having an enlarged end portion normally adapted to seal against the outlet side of said restricted valve member passage and a collar intermediate its ends; second spring means bearing between said collar and said valve member and urging said pilot valve member toward its closed position, said second spring being weaker than said first spring; whereby when said pilot valve is moved against the pressure of said second spring in the direction away from said plug, by the fluid pressure inside said cylinder, its enlarged end portion moves beyond said restricted portion, thereby losing contact with said main valve member and permitting the flow of fluid therebetween, causing a reduction of fluid pressure in the passage area lying between said plug and said main valve member, thereby enabling the undiminished pressure against said exterior shoulder to urge said main valve away from its seat to overcome the diminished force in the opposite direction and the pressure of said first spring and open said main valve, so that fluid will flow directly from said inlets to said outlet; and whereby the movement of said pilot valve in the opposite direction by the pressure of said second spring overcoming a reduced fluid pressure inside said cylinder, when said main valve is open, restricts the flow of fluid out from between said main valve and said plug, thereby building up pressure that, in cooperation wtih said first spring, moves said main valve toward and against its seat.

2. The valve of claim 1 in which said pilot valve member is made up of two separate parts, one a solid stem including the end enlargement, the other a hollow tubular sleeve including said collar and threaded around said solid stem for adjustment of the actuating pressure that opens said pilot valve.

3. The valve of claim 1 in which the interior passage through said main valve member is twice stepped inwardly between said outer piston end and the restricted portion, said steps forming, respectively, seats for one end of each of said first and second springs.

4. The valve of claim 1 in which the fluid conducting means comprises loose clearance of the main valve in the cylinder and loose clearance of said pilot valve in the plug guide passage.

References Cited in the file of this patent

UNITED STATES PATENTS

| | | |
|---|---|---|
| 1,286,872 | Cash | Dec. 3, 1918 |
| 1,807,191 | Boyle | May 26, 1931 |
| 2,413,622 | Harding | Dec. 31, 1946 |

FOREIGN PATENTS

| | | |
|---|---|---|
| 4,370 | Germany | of 1878 |
| 347,338 | France | of 1905 |
| 268,586 | Great Britain | Apr. 7, 1927 |
| 295,306 | Italy | of 1932 |